United States Patent
Toyoshima et al.

(10) Patent No.: US 6,473,235 B2
(45) Date of Patent: Oct. 29, 2002

(54) TOUCH PANEL SUBSTRATE HAVING TRANSPARENT CONDUCTIVE FILM

(75) Inventors: Takayuki Toyoshima; Daisuke Arai; Toshiaki Anzaki; Etsuo Ogino, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/783,331

(22) Filed: Feb. 15, 2001

(65) Prior Publication Data

US 2001/0040733 A1 Nov. 15, 2001

(30) Foreign Application Priority Data

Feb. 18, 2000 (JP) ........................................ 2000-041308
Apr. 3, 2000 (JP) ........................................ 2000-100369

(51) Int. Cl.[7] ................................................. G02B 1/10
(52) U.S. Cl. ...................... 359/585; 359/580; 345/173
(58) Field of Search ................................. 359/582, 585; 252/519.5, 520.1, 582, 583; 345/173; 200/512; 428/210, 336, 432, 701, 702; 257/72

(56) References Cited

U.S. PATENT DOCUMENTS 5,628,933 A * 5/1997 Carter et al. .............. 252/519.1
5,668,576 A * 9/1997 Ikura et al. ................. 345/173

* cited by examiner

Primary Examiner—Cassandra Spyrou
Assistant Examiner—Arnel C. Lavarias
(74) Attorney, Agent, or Firm—Sughrue Mion, PLLC

(57) ABSTRACT

A transparent touch panel substrate comprising a transparent substrate and deposited thereon a transparent conductive metal oxide film which contains zinc, indium, and tin as metallic elements and is soluble in acids. The transparent conductive metal oxide film preferably contains zinc in an amount of from 40 to 65 atomic % based on all metals and contains indium in an amount of from 0.25 to 1.3 times the amount of tin on an atomic basis. The film preferably has a thickness of from 100 to 160 nm. Unlike the conventional substrate for resistive film type transparent touch panels which comprises a glass plate coated with a transparent conductive ITO film, the touch panel substrate of the invention combines three properties: high light transmittance; ease of processing in forming a transparent electrode by acid etching; and the transparent conductive film has a moderate sheet resistance of from 500 to 5,000Ω. It therefore realizes a touch panel which combines the three functions of having satisfactory display quality, being of the power-saving type, and enabling touch switch operations to be conducted without fail.

4 Claims, 3 Drawing Sheets

TOUCH PANEL SUBSTRATE HAVING TRANSPARENT CONDUCTIVE FILM

FIELD OF THE INVENTION

The present invention relates to a transparent touch panel substrate and a transparent touch panel employing the same.

DESCRIPTION OF THE RELATED ART

Indium oxide containing from 3 to 10% by weight tin oxide (hereinafter referred to as "ITO") for use as a transparent electrode in liquid-crystal displays is widely used as a transparent electrode formed on a transparent substrate for transparent touch panels, because it is transparent and can be easily processed in electrode formation. Transparent conductive tin oxide films also are used as transparent electrodes for transparent touch panels because they have satisfactory transparency.

The composition of a transparent conductive ITO film for use in liquid-crystal displays is designed so that the film has the lowest possible value of electrical resistivity (specific resistance) Because of this, the conventional transparent conductive film has a problem that the resistance thereof is so low as will be described later that the film is unsuitable for use as electrodes in transparent touch panels, in which the electrodes are required to have moderate sheet resistance.

Attempts have been made to form a transparent conductive ITO film having a reduced thickness so as to impart moderate sheet resistance thereto. However, in order for a transparent conductive ITO film to have the necessary moderate sheet resistance, the thickness thereof should be reduced to about 10 nm or smaller. There has been a problem that such reduced thicknesses result in difficulties in obtaining values of sheet resistance with satisfactory reproducibility because of fluctuations of film deposition conditions, differences of heat history in a production process, etc.

Furthermore, the transmittance of light in substrates coated with a transparent conductive ITO film having a thickness in such a small-thickness range greatly depends on the film thickness as shown in FIG. 5 because of the refractive index of the film (about 2.0 at awavelength of 550 nm). Consequently, the substrates having this type of transparent conductive film have problems that it is difficult to stably obtain a given transmittance and that there is a large difference in transmittance between the uncoated areas of the transparent substrate and those areas of the transparent substrate which are coated with the transparent conductive film. Due to this difference in transmittance, products employing this conventional substrate have a drawback that the areas coated with the transparent electrode are easily recognized.

A technique for avoiding or overcoming such problems is known in which a high transmittance is obtained by regulating the thickness of an ITO film so as to result in an optical thickness (product of the refractive index n and the actual film thickness d; nd) of around 138 nm, which is the half-wave length (½)λ (λ=550 nm) of 550 nm, which is the central wavelength in the visible light region (see FIG. 5). However, the ITO film having such optical thickness equal to the half-wave length and hence attaining a high transmittance has a reduced value of resistance because of the inadequate specific resistance of the film. Consequently, the transparent touch panel produced with this technique has a problem that the amount of current flowing through the panel in its ON state is large, resulting in increased power consumption.

On the other hand, in the case of using tin oxide as a transparent electrode, a moderate degree of sheet resistance required of transparent electrodes for touch panels is obtained since tin oxide has a higher specific resistance than ITO films. However, there has been a problem that it is extremely difficult to process a tin oxide film in electrode formation therefrom and, in particular, it is difficult to use the tin oxide film to produce a touch panel having the function of delicate touch switching.

SUMMARY OF THE INVENTION

The invention is intended to overcome the above-described problems of the ITO film and tin oxide film for use as a transparent conductive film for a touch panel substrate.

Accordingly, an object of the invention is to provide a transparent conductive film having both of the following properties:

1) to have a high transmittance; and
2) to be capable of being easily processed in electrode formation therefrom.

Another object of the invention is to provide a substrate having a transparent conductive film which also has:

3) a value of sheet resistance suitable for obtaining a power-saving type touch panel.

The invention provides a transparent touch panel substrate comprising a transparent substrate and deposited thereon a transparent conductive metal oxide film which contains zinc, indium, and tin as metallic elements and is soluble in acids.

The transparent conductive film according to the invention is a film of a metal oxide mixture comprising zinc oxide, indium oxide, and tin oxide, which each has a refractive index of about 2.0 at a wavelength of 550 nm, or is constituted of a composite oxide comprising these metal oxides. Consequently, the transparent conductive metal oxide film according to the invention is characterized by having a refractive index of about 2.0 at a wavelength of 550 nm.

In the transparent conductive metal oxide film according to the invention, the zinc oxide is an ingredient which is soluble in acids and serves to regulate the specific resistance of the film. The indium oxide is an ingredient which is soluble in acids and serves in cooperation with tin to reduce the specific resistance of the film. The tin oxide is an ingredient which improves the wearing resistance of the film and improves resistance to chemicals including alkalis.

In a preferred embodiment of the touch panel substrate of the invention, the transparent conductive metal oxide film has a thickness of from 100 to 160 nm.

When a transparent conductive film according to the invention having the refractive index shown above is deposited on one side of a glass plate having a refractive index of about 1.5 at 550 nm, the transmittance of a light passing through both the transparent conductive film and the glass plate changes with the thickness of the film as shown in FIG. 5.

According to this preferred embodiment of the invention, since the transmittance is as high as about 90% as apparent from FIG. 5, there is no fear of giving a dark display. The optical thickness of this transparent conductive film roughly corresponds to a half of the design wavelength λ. By regulating the thickness of the transparent conductive film to a value in the range of from 100 to 150 nm, the transmittance of a light passing through the transparent conductive film and the glass plate becomes closer to the transmittance for the glass plate alone (92%).

In another preferred embodiment of the touch panel substrate of the invention, the transparent conductive metal oxide film contains zinc in an amount of from 40 to 65 atomic % based on all metals and contains indium in an amount of from 0.25 to 1.3 times the amount of tin on an atomic basis.

Zinc contents exceeding 65 atomic % are undesirable in that the film has too high a specific resistance and that the alkali resistance of the film abruptly becomes poor with increasing zinc content. Furthermore, the metal oxide film having such too high a zinc content is undesirable in that the film, upon heating, e.g., in the step of laminating with a resin film, comes to have considerably increased electrical resistance and impaired heat resistance. On the other hand, zinc contents lower than 40 atomic % based on all metals are undesirable in that the film has too low a specific resistance.

Indium atom contents in the film exceeding 1.3 times the content of tin atoms are undesirable in that the film has not only a reduced specific resistance but reduced wearing resistance. Such too high indium contents are undesirable also from the standpoint of profitability because the cost of raw materials for the coating film is high. Furthermore, such too high indium contents are apt to result in difficulties in stably depositing a film having a given resistance on a substrate by sputtering. On the other hand, indium atom contents in the film lower than 0.25 times the content of tin atoms are undesirable in that the film has reduced solubility in acids and this makes it impossible to complete processing for electrode formation in a short time.

According to the embodiment described above, the transparent conductive film can be regulated so as to have a sheet resistance of about from 500 to 5,000Ω. Sheet resistances of the transparent conductive film lower than 500Ω are undesirable in that when two-transparent substrates each coated with the transparent conductive film are disposed so that the conductive films face each other to fabricate a touch panel, then the amount of current flowing upon contact of the opposed transparent conductive films (in the ON state) is large, resulting in increased power consumption. On the other hand, sheet resistances of the transparent conductive film exceeding 5,000Ω are undesirable in that the contact of the opposed conductive films results in unstable electrical connection.

Namely, according to the embodiment described above, the transparent conductive film not only can have a transmittance equal to that of the glass plate but also enables the production of a touch panel which is of the power-saving type and in which ON/OFF switching operations can be conducted without fail.

It is preferred to regulate the contents of zinc oxide, indium oxide, and tin oxide in the transparent conductive metal oxide film according to the invention so that the film has a specific resistance of from $5 \times 10^{-3}$ to $75 \times 10^{-3}$ Ωcm.

In still another embodiment of the touch panel substrate of the invention, the transparent substrate is a glass plate. Although this glass plate is not particularly limited in composition, a float glass having a soda-lime silicate composition (refractive index, 1.52) is generally preferred.

The invention further provides a resistive film type transparent touch panel employing the glass-based transparent touch panel substrate described above. This resistive film type transparent touch panel has satisfactory display quality because the transparent electrode has a high transmittance. Furthermore, by regulating the area of the transparent electrode to a given value, the touch panel can be of the power-saving type and switching operations can be conducted without fail.

DESCRIPTION OF THE PREFERRED NUMERALS

Figure 1:
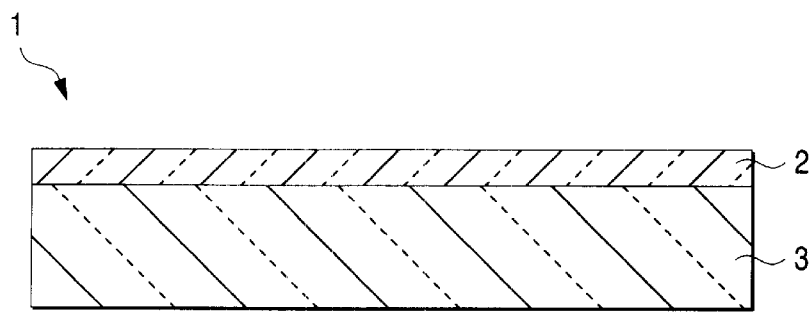
FIG. 1 is a sectional view of one embodiment of the transparent touch panel substrate of the invention.

1: Transparent touch panel substrate of the invention
2: Transparent conductive film
3: Glass plate
4: Transparent conductive film
5: Resin plate
6: Spacer
7: Transparent touch panel of the invention Description of the Preferred Embodiments FIG. 1 is a sectional view of one embodiment of the transparent touch panel substrate of the invention. This transparent touch panel substrate 1 comprises a transparent substrate 3 and a transparent conductive metal oxide film 2 deposited on one side of the substrate 3. The transparent substrate can be a glass plate or a resin plate. The glass plate is not particularly limited in composition and may have the same soda-lime silicate composition as window glasses or have a borosilicate glass composition, etc. In the case of using a glass containing a large amount of soda, an alkali dissolution preventive film such as a silicon dioxide film may be formed thereon. Examples of the resin plate include plates made of resins such as acrylics, polyesters, polycarbonates, polypropylene, and polyethylene.

The transparent conductive film according to the invention comprises zinc oxide and indium oxide as acid-soluble ingredients and tin oxide as a sparingly acid-soluble ingredient. By suitably selecting the proportions of these three ingredients, satisfactory processability by etching can be imparted to the transparent conductive film. When this film is masked with a photoresist so as to cover only the areas to be left as electrodes and the masked film is treated with an etchant which is an aqueous hydrochloric acid solution, then electrodes can be formed in a relatively short time.

Figure 2:
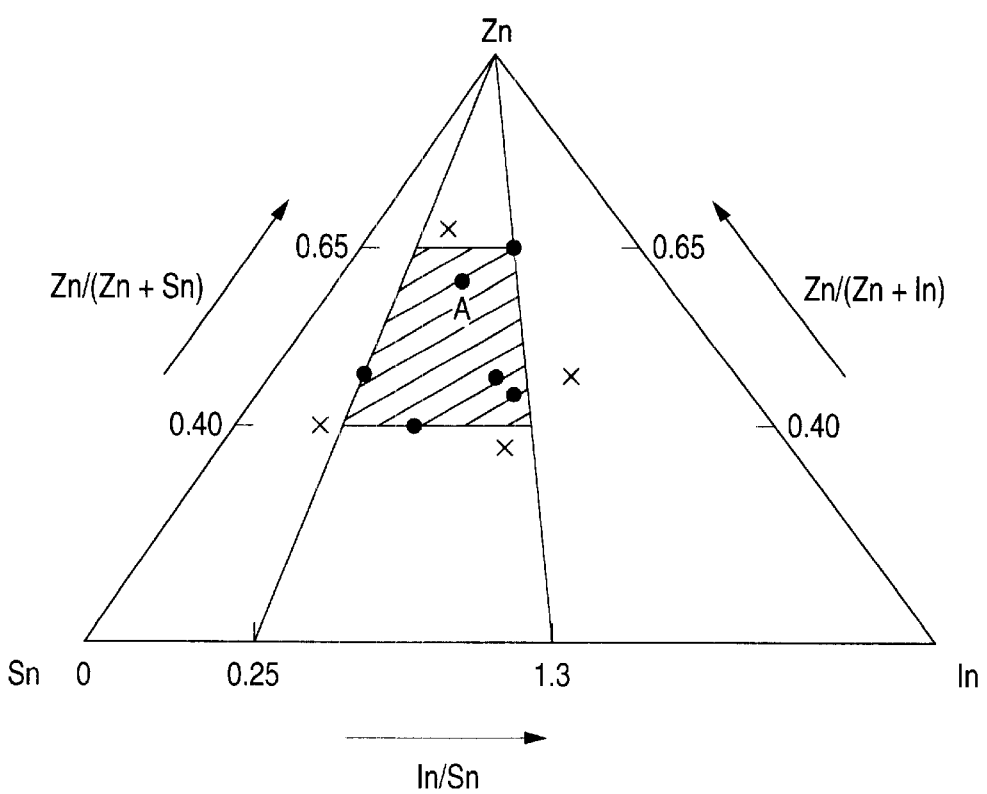
FIG. 2 is a presentation illustrating preferred ranges of the contents of three metallic elements, i.e., zinc, indium, and tin, in the transparent conductive film according to the invention.

FIG. 2 is a diagram in which compositions of the transparent conductive film according to the invention composed of zinc oxide, indium oxide, and tin oxide are shown in terms of atomic ratio between the metals in the three-component system. Plots of the compositions obtained in Examples 1 to 6 are indicated by solid circles, while plots of the compositions obtained in Examples 7 to 10 are indicated by cross symbols.

Zinc oxide is an ingredient which makes the transparent conductive film soluble in acids and is used for regulating the specific resistance of the film. Indium oxide is an ingredient which makes the transparent conductive film soluble in acids and serves, in cooperation with tin, to reduce the specific resistance of the film. Tin oxide is an ingredient which improves the wearing resistance of the film. From the standpoint of obtaining a film having a reduced specific resistance, it is preferred to employ a composition which is within the region A shown in FIG. 2 and is closer to the indium vertex (indium 100%). From the standpoint of obtaining a film having enhanced wearing resistance and enhanced resistance to acids or alkalis, it is preferred to employ a composition which is within the region A and is closer to the tin vertex. Zinc oxide functions to regulate the electrical resistance of the film to a value suitable for transparent conductive films for transparent touch panels.

The transparent conductive film according to the invention can be deposited on a surface of a substrate by a known technique such as sputtering, vapor deposition, or CVD. Of these techniques, sputtering is preferred in that there is no need of heating the substrate at a high temperature and the film can be deposited even on a resin plate. In the case where the conductive film is deposited by sputtering, an oxide mixture obtained by sintering a finely powdered mixture of zinc oxide, indium oxide, and tin oxide can be used as a target to conduct sputtering with DC glow discharge while utilizing the slight conductivity of the target.

Figure 3:
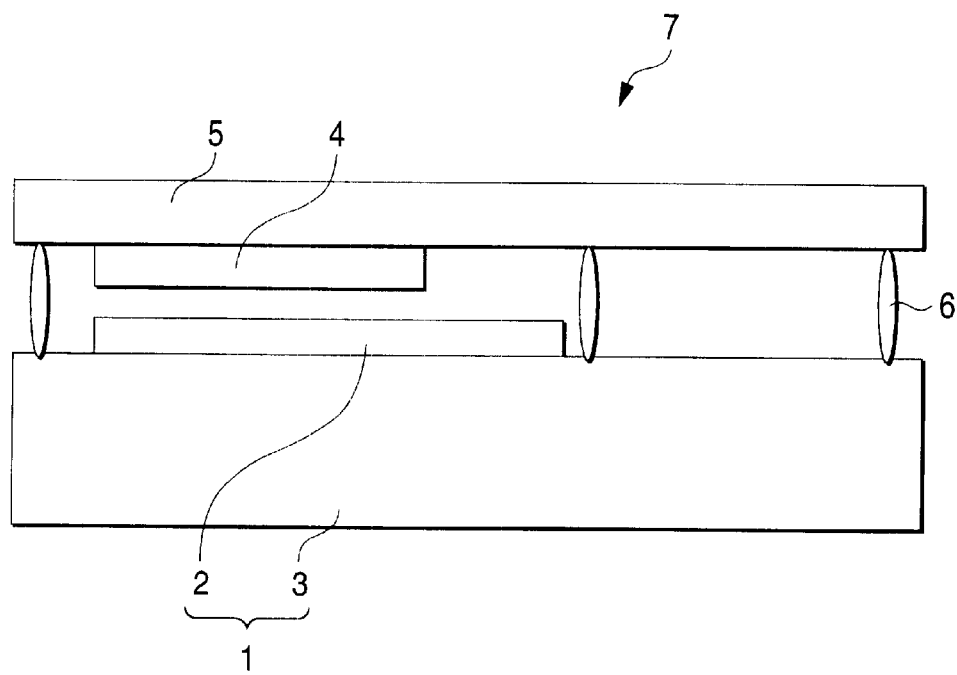
FIG. 3 is a sectional view of an important part of one embodiment of the transparent touch panel of the invention.

FIG. 3 illustrates one embodiment of the transparent touch panel of the invention. This touch panel comprises: a transparent touch panel substrate 1 obtained according to the invention which has a transparent conductive metal oxide film 2 according to the invention; and a resin plate 5 having a transparent conductive film 4. The transparent touch panel substrate 1 and the resin plate 5 are disposed so that the transparent conductive films 2 and 4 face each other. The substrate 1 according to the invention and the plate 5 have been fixed so as to be apart from each other at a distance of about 150 μm with glass spacers 6.

Figure 4:
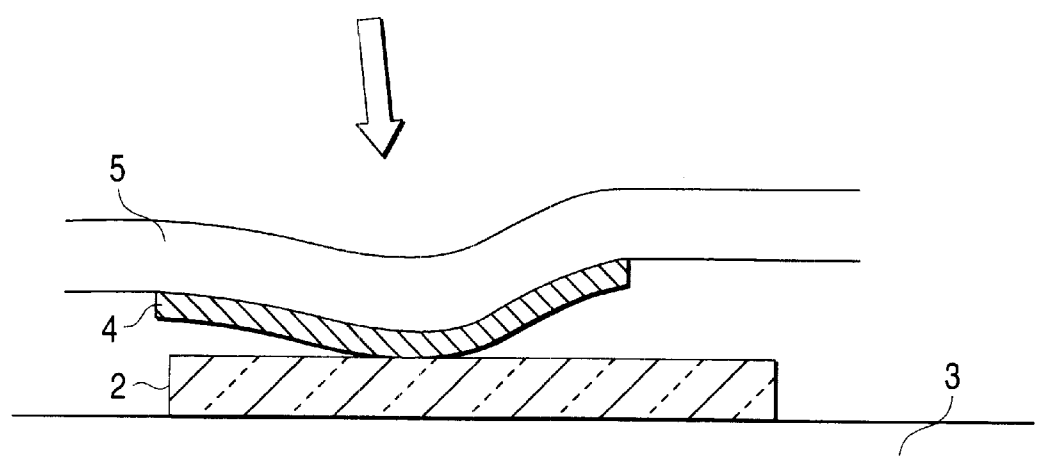
FIG. 4 is a view illustrating the transparent touch panel of the invention in the switch-ON state.
Figure 5:
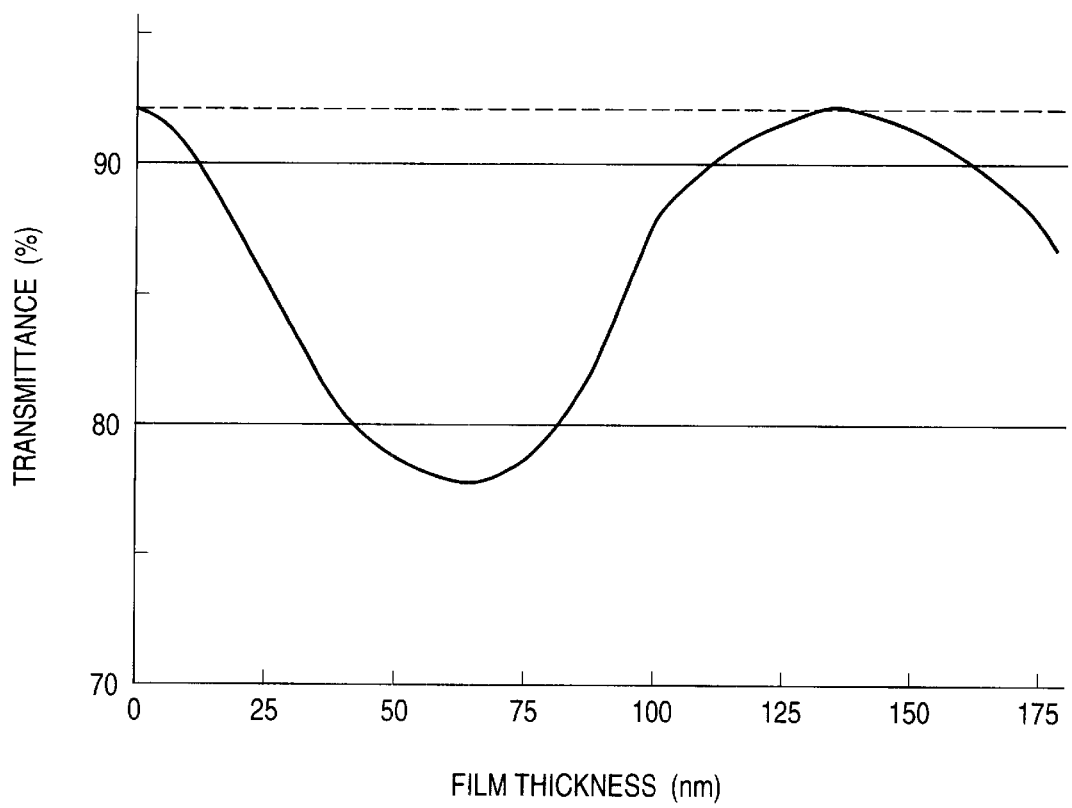
FIG. 5 is a presentation showing the relationship between the transmittance of light having a wavelength of 550 nm in a transparent conductive film according to the invention and the thickness of the film.

FIG. 4 is a view illustrating the transparent touch panel of the invention which is in an operated state. When the resin plate 5 is pressed with a finger in the direction indicated by the arrow, then the resin plate 5 deforms and the transparent conductive film (transparent electrode) 4 formed on the resin plate 5 comes into contact with the transparent conductive film (transparent electrode) 2 formed on the glass plate 3. As a result, the touch panel comes into the ON state and current flows through the electrodes. When the finger is separated from the resin plate 5, then the resin plate 5 recovers its original shape and the touch panel comes into the OFF state. In the touch panel of the invention, the amount of current flowing through the panel in its ON state can be reduced and, upon pressing for establishing an ON state, an electrical contact can be obtained without fail, by regulating the transparent electrode 2 so as to have a three-component composition consisting of zinc oxide, indium oxide, and tin oxide and to have a sheet resistance of from 500 to 5,000Ω. Furthermore, the touch panel has satisfactory display quality because transmittance can be heightened while maintaining a sheet resistance in that range.

The invention will be explained below in more detail by reference to Examples and Comparative Examples. In each of the Examples and Comparative Examples was used a float glass plate having a soda-lime silicate composition (thickness, 1.1 mm; transmittance of the glass plate alone at 550 nm, 92%) as a transparent substrate. Transparent conductive films were deposited by DC sputtering under the following conditions.

Deposition Conditions
1) Glass plate temperature during deposition: 300° C.
2) Sputtering target: a target obtained by compacting a powder mixture composed of zinc oxide, indium oxide, and tin oxide shown in Table 1 by cold pressing and sintering the compact.
3) Atmosphere for sputtering: pressure, 0.4 Pa; argon/oxygen mixed gas having an oxygen concentration of 1% by volume.

Methods for Coating Film Evaluation
1) Sheet Resistance
  1) Sheet Resistance
  Sheet resistance was measured by the four-probe method. Specific resistance was calculated from the value of sheet resistance and the thickness of the film measured with a contact probe type profilometer. Each substrate was evaluated for suitability for use as a resistive film type touch panel substrate in terms of sheet resistance based on the following criteria.
  ▫: from 500 to 5,000Ω (having power-saving effect and enabling switching operations to be conducted without fail).
  ○: not lower than 200Ω but lower than 500Ω (having lessened power-saving effect but enabling switching operations to be conducted without fail).
  ⊐: exceeding 5,000Ω but not higher than 10,000Ω (having power-saving effect but reduced certainty about switching operations).
  +: lower than 200Ω (necessitating a large quantity of current to show large power consumption, although enabling switching operations to be conducted without fail).

2) Transmittance
  Transmittance at a wavelength of 550 nm was measured with a commercial spectrophotometer. The coated glass plate was evaluated in terms of the relationship between the display quality of the resistive film type touch panel obtained therefrom and the transmittance based on the following criteria.
  ○: the touch panel had almost the same transmittance as the glass plate.
  ▫: the touch panel had slightly lower transmittance than the glass plate.
  +: the touch panel had far lower transmittance than the glass plate.

3) Processability in Electrode Formation
  A sample was immersed in an etchant which was a mixed solution of hydrochloric acid and water (1:1 in volume ratio) heated at 40° C., and the state of the film removed by etching was examined. The processability was evaluated based on comparison with the ITO film deposited in Comparative Example 1.
  ⊐: the film could be removed by etching in a short time equal to that required for ITO.
  ○: the film could be removed by etching in a slightly longer time than ITO.
  +: the film could not be removed by etching in 5 minutes.

EXAMPLE 1

Powdered reagents of ZnO, $In_2O_3$, and $SnO_2$ were mixed with each other with a mortar in such a proportion as to result in the composition shown in Table 1. This powder mixture was compacted by cold pressing and the compact was sintered to obtain a sputtering target. This sinter target was used to deposit a film on a glass plate by DC magnetron sputtering for such a time period as to result in the film thickness shown in Table 1. As a result, a substrate having a transparent conductive film could be obtained which had a sheet resistance of 1,600Ω/□ and a transmittance of 94%. Namely, this coated substrate was highly transparent while retaining a desired value of resistance.

EXAMPLES 2 TO 6

A transparent conductive film was deposited on a glass plate in the same manner as in Example 1, except that the target composition was changed. As shown in Table 1, the samples thus obtained each had a moderate sheet resistance in the range of from 500 to 5,000Ω and a transmittance of 90% or higher. The samples obtained in Examples 1 to 6 each combined a high transmittance, moderate sheet resistance, and satisfactory processability in electrode formation and was an especially preferred sample of the substrate according to the invention. These samples were rated as ⊙ in comprehensive evaluation.

EXAMPLES 7 TO 10

A transparent conductive film was deposited on a glass plate in the same manner as in Example 1, except that the target composition was changed. As shown in Table 1, the samples thus obtained each had a transmittance of 91%. However, the sheet resistances of the samples obtained in Examples 7, 9, and 10 were 320 Ω, 220 Ω, and 390 Ω, respectively, which were slightly lower than the lower limit in the moderate-resistance range shown above. These films were found to be effective in conducting ON/OFF operations without fail although less effective in power saving. On the other hand, the sample obtained in Example 8 had a transmittance of 92%, which was not lower than the transmittance of the glass plate, and had a sheet resistance of 9,800Ω, which was slightly higher than the upper limit in the desirable moderate-resistance range shown above. However, this sample was able to secure electrical connection upon contact of the transparent electrode in practical use.

Furthermore, all these samples had satisfactory processability in electrode formation. Consequently, the samples obtained in Examples 7 to 10 each was rated as ○ in comprehensive evaluation.

Comparative Example 1

The same procedure as in Example 1 was conducted, except that a powder mixture of commercially available $In_2O_3$ powder and $SnO_2$ powder ($SnO_2$ content, 10% by weight) was used as a target. Thus, an ITO film having a thickness of 130 nm was deposited on a glass plate. The sample obtained had a transmittance of 91%, but had a sheet resistance as low as 23Ω. Consequently, this sample was unsuitable for use as a substrate for power-saving type transparent touch panels.

Comparative Example 2

An ITO film was deposited on a glass plate in the same manner as in Comparative Example 1, except that the film thickness was changed (reduced to 20 nm). The results of evaluation of the sample obtained are shown in Table 1. This sample had a sheet resistance as low as 150Ω and had a lower transmittance than the glass plate alone. This sample was thought to be a substrate which, when used in a touch panel, was causative of a decrease in display quality.

Comparative Example 3

The same procedure as in Example 1 was conducted, except that $SnO_2$ powder was used as a target and that film deposition was conducted by high-frequency sputtering. Thus, a tin oxide film having a thickness of 130 nm was deposited on a glass plate. The sample obtained had a transmittance as high as 90% and a satisfactory sheet resistance of 550Ω. However, this transparent conductive film was unable to be etched and was substantially unable to be processed in electrode formation.

TABLE 1

| Film composition (atomic ratio) | | Film thickness (nm) | Sheet resistance (Ω) | (specific resistance) ($\times 10^{-3}$ Ωcm) | Transmittance 550 nm (%) | Processability in electrode formation | Comprehensive evaluation |
|---|---|---|---|---|---|---|---|
| Zn/ (Zn + In + Sn) | In/ Sn | | | | | | |
| (Example) | | | | | | | |
| 1 | 0.5 | 1.0 | 130 | 1600 | ⊙ (21) | 91 ○ | ⊙ | ⊙ |
| 2 | 0.65 | 1.3 | 130 | 2500 | ⊙ (33) | 91 ○ | ⊙ | ⊙ |
| 3 | 0.4 | 0.5 | 130 | 610 | ⊙ (7.9) | 92 ○ | ⊙ | ⊙ |
| 4 | 0.5 | 0.25 | 130 | 3900 | ⊙ (51) | 92 ○ | ⊙ | ⊙ |
| 5 | 0.6 | 0.7 | 130 | 5000 | ⊙ (65) | 91 ○ | ⊙ | ⊙ |
| 6 | 0.45 | 1.2 | 130 | 500 | ⊙ (5.4) | 90 ○ | ⊙ | ⊙ |
| 7 | 0.35 | 1.0 | 130 | 320 | ○ (4.2) | 91 ○ | ⊙ | ○ |
| 8 | 0.7 | 0.5 | 130 | 9800 | Δ (127) | 90 ○ | ○ | ○ |
| 9 | 0.45 | 1.5 | 130 | 220 | ○ (2.9) | 90 ○ | ○ | ○ |
| 10 | 0.4 | 0.2 | 130 | 390 | ○ (5.1) | 91 ○ | Δ | ○ |
| (Comparative Example) | | | | | | | |
| 1 | 0 | 9.8 | 130 | 23 | X (3.0) | 91 ○ | ⊙ | X |
| 2 | 0 | 9.8 | 20 | 150 | X (3.0) | 85 X | ⊙ | X |
| 3 | 0 | 0 | 130 | 550 | ○ (7.2) | 90 ○ | Unable to be etched | X |

Note) Films of Comparative Examples 1 and 2 were ITO films and that of Comparative Example 3 was a tin oxide film.

The Examples and Comparative Examples given above demonstrate that the transparent conductive metal oxide films containing zinc, indium, and tin as metallic elements have a high transmittance and satisfactory processability in electrode formation therefrom when applied to a transparent touch panel substrate. Furthermore, since the films have a moderate degree of sheet resistance, they are effective in power saving and stable switching. The results show that the resistive film type touch panel (touch switch) employing the substrate of the invention has satisfactory display quality and can be operated in switching without fail. This touch panel is expected to be a power-saving type touch panel.

The transparent conductive film according to the invention may contain one or more metal oxides other than the three metal oxides described above, as long as the presence of such optional ingredients does not defeat the objects of the invention.

The transparent touch panel substrate of the invention has a high transmittance and satisfactory processability in electrode formation by etching with an aqueous acid solution, because the transparent conductive film deposited on the transparent substrate is an acid-soluble metal oxide film comprising a three-component system containing zinc, indium, and tin as metallic elements. Because of this, a transparent touch panel having satisfactory display quality can be produced.

In addition, by regulating the contents of the three ingredients of zinc, indium, and tin in the transparent conductive film to values in their respective given ranges, the transparent conductive film can be made to have a moderate degree of sheet resistance. Consequently, not only the resistive film type transparent touch panel can be of the power-saving type in which the avantity of current flowing in the panel in its ON state is small, but also ON/OFF switching operations thereof can be stably conducted without fail.

What is claimed is:

1. A transparent touch panel substrate comprising a transparent substrate and deposited thereon a transparent conductive metal oxide film which contains zinc, indium, and tin as metallic elements and is soluble in acids, wherein the transparent conductive metal oxide film contains zinc in an amount of from 40 to 65 atomic % based on all metals and contains indium in an amount of from 0.25 to 1.3 times the amount of tin on an atomic basis.

2. The transparent touch panel substrate of claim 1, wherein the transparent conductive metal oxide film has a thickness of from 100 to 160 nm.

3. The transparent touch panel substrate of claim 1, wherein the transparent substrate is a glass plate.

4. A resistive film type transparent touch panel having two substrates, one of which is the transparent touch panel substrate of claim 3.

* * * * *